United States Patent [19]
Ghosh

[11] Patent Number: 5,900,016
[45] Date of Patent: May 4, 1999

[54] SYSTEM FOR USING A CACHE MEMORY WITH A WRITE-BACK ARCHITECTURE

[75] Inventor: Subir K. Ghosh, San Jose, Calif.

[73] Assignee: OPTi Inc., Milpitas, Calif.

[21] Appl. No.: 08/825,888

[22] Filed: Apr. 2, 1997

[51] Int. Cl.$^6$ ................................................. G06F 12/00
[52] U.S. Cl. .................. 711/143; 711/141; 711/143; 711/146
[58] Field of Search ................. 711/146, 143, 711/122, 144, 128, 135, 141, 133

[56] References Cited

U.S. PATENT DOCUMENTS

| | | | |
|---|---|---|---|
| 4,939,641 | 7/1990 | Schwartz et al. | 364/200 |
| 5,155,824 | 10/1992 | Edenfield et al. | 711/143 |
| 5,420,994 | 5/1995 | King et al. | 395/425 |
| 5,524,234 | 6/1996 | Martinez, Jr. et al. | 711/141 |
| 5,537,575 | 7/1996 | Foley et al. | 395/468 |
| 5,553,266 | 9/1996 | Metzger et al. | 395/471 |
| 5,557,769 | 9/1996 | Bailey et al. | 711/146 |
| 5,632,038 | 5/1997 | Fuller | 395/750.06 |
| 5,708,792 | 1/1998 | Hayes et al. | 711/108 |

*Primary Examiner*—John W. Cabeca
*Assistant Examiner*—Meadi Namazi
*Attorney, Agent, or Firm*—Fliesler, Dubb, Meyer & Lovejoy LLP

[57] ABSTRACT

A computer system includes a microprocessor, a cache memory, main memory and supporting logic. The supporting logic includes cache control logic that determines whether an access to memory results in a hit to the cache for dirty or clean data. When a write to the cache results in a hit to clean data, the bus cycle is enlarged in order to set a dirty bit associated with the write data. The bus cycle is enlarged by requesting the processor to refrain from commencing a new bus cycle or driving a new memory address.

40 Claims, 8 Drawing Sheets

SYSTEM FOR USING A CACHE MEMORY WITH A WRITE-BACK ARCHITECTURE

BACKGROUND OF THE INVENTION

1. Field of the Invention

The present invention is directed to a method and apparatus for using a cache memory in a computer system.

1. Description of the Related Art

Many computers today include one, and usually two, levels of cache memory. A cache memory is a high-speed memory that is positioned between a central processing unit (CPU) and main memory in a computer system in order to improve system performance. Cache memories (or caches) store copies of portions of main memory data that are actively being used by the CPU while a program is running. Since the access time of a cache can be faster than that of main memory, the overall access time can be reduced.

Many microprocessor-based systems implement a "direct mapped" cache memory. In general, a direct mapped cache memory comprises a high speed data Random Access Memory (RAM) and a parallel high speed tag RAM. The RAM address of each line in the data cache is the same as the low-order portion of the main memory line address to which the entry corresponds. The high-order portion of the main memory address is stored in the tag RAM. Thus, if main memory is thought of as $2^m$ blocks of $2^n$ lines of one or more bytes each, the i'th line in the cache data RAM will be a copy of the i'th line of one of the $2^m$ blocks in main memory. The identity of the main memory block that the line came from is stored in the i'th location in the tag RAM.

When a CPU requests data from memory, the low-order portion of the line address is supplied as an address to both the cache data and cache tag RAMs. The tag for the selected cache entry is compared with the high-order portion of the CPU's address and, if it matches, then a "cache hit" is indicated and the data from the cache data RAM is enabled onto a data bus of the system. If the tag does not match the high-order portion of the CPU's address, or the tag data is invalid, then a "cache miss" is indicated and the data is fetched from main memory. It is also placed in the cache for potential future use, overwriting the previous entry. Typically (but not required in all systems), an entire line is read from main memory and placed in the cache on a cache miss, even if only a byte is requested. On a data write from the CPU, either the cache or main memory or both may be updated.

Accordingly, in a direct mapped cache, each "line" of secondary memory can be mapped to one and only one line in the cache. In a "fully associative" cache, a particular line of secondary memory may be mapped to any of the lines in the cache. In the fully associative cache, all of the tags may be compared to the address in order to determine whether a cache hit or miss has occurred. "K-way set associative" cache architectures also exist which represent a compromise between direct mapped caches and fully associative caches. In a k-way set associative cache architecture, each line of secondary memory may be mapped to any of k lines in the cache. In this case, k tags must be compared to the address during a cacheable secondary memory access in order to determine whether a cache hit or miss has occurred. Caches may also be "sector buffered" or "sub-block" type caches, in which several cache data lines, each with its own valid bit, correspond to a single cache tag RAM entry.

When the CPU executes instructions that modify the contents of the cache, these modifications must also be made in the main memory or the data in main memory will become "stale." There are two conventional techniques for keeping the contents of the main memory consistent with that of the cache—(1) the write-through method and (2) the write-back or copy-back method. In the write-through method, on a cache write hit, data is written to the main memory immediately after or while data is written into the cache. This enables the contents of the main memory always to be valid and consistent with that of the cache. In the write-back method, on a cache write hit, the system writes data into the cache and sets a "dirty bit" which indicates that the data has been written into the cache but not into the main memory. A cache controller checks for a dirty bit before overwriting a line of data in the cache, and if set, writes the line of cache data out to main memory before loading the cache with new data.

A computer system can have more than one level of cache memory for a given address space. For example, in a two-level cache system, the level one (L1) cache is logically adjacent to the host processor. The level two (L2) cache is logically behind the L1 cache. Main memory (e.g. DRAM) is located logically behind the L2 cache. When the CPU performs an access to an address in the memory address space, the L1 cache responds if possible. If the L1 cache cannot respond (for example, because of an L1 cache miss), then the L2 cache responds if possible. If the L2 cache also cannot respond, then the access is made to main memory. The CPU does not need to know how many levels of caching are present in the system or indeed that any caching exists at all. Similarly, the L1 cache does not need to know whether a second level of caching exists. Thus, to the CPU unit, the combination of both caches and main memory is considered merely as a single main memory structure. Similarly, to the L1 cache, the combination of the L2 cache and main memory is considered simply as a single main memory structure. In fact, a third level of caching could be included between the L2 cache and the main memory, and the L2 cache may still consider the combination of L3 and main memory as a single main memory structure.

As microprocessor technology has advanced, level one caches have been included on the microprocessor chip itself. In systems employing a microprocessor with an in-chip L1 cache, a L2 cache is typically part of a supporting chip set. One drawback of some L2 cache designs is that they include, a performance penalty for setting the dirty bit. For example, one L2 cache that can be used as a write back cache includes a tag store for storing L2 tags and a dirty bit store for storing L2 dirty bits. Typically, the tag store and dirty bit store are SRAMs. Some systems use separate SRAMs for the dirty bit store and the tage store. However, to save resources (cost, space, power, heat, silicon etc.), the tag store and dirty bit store can be combined in one SRAM. For example, a 32 k×9 SRAM can be used to store eight bit tags and a dirty bit for each line in the L2 cache, or a 32 k×8 SRAM can be used to store a 7 bit tag and a dirty bit.

Many SRAMs include one set of bidirectional pins for both reading and writing data (rather than separate I/O pins) in order to reduce costs. The default state is likely to be output. When writing dirty bits to a dirty bit store implemented with an SRAM having bidirectional data pins, extra time is needed to assert a write enable in order to change the dirty bit pin to an input pin and set up for the write operation. Thus, the bus cycle can be expanded by two clocks or more to accommodate for the writing of dirty bits. In some designs, setting the dirty bit causes a performance penalty even if the dirty bit store has separate data input and output pins. For example, the time needed to write the new dirty bit can be a performance penalty.

Since computers are judged by their price and performance, computer makers strive to increase the speed and efficiency of their computers without significantly increasing costs. Thus, there is a need for a system of writing to a cache memory that reduces the performance penalty for setting a dirty bit.

SUMMARY OF THE INVENTION

The present invention is directed to overcome the disadvantages of the prior art. Thus, the present invention, roughly described, provides for a system for using a cache memory which receives write data, receives an address, determines whether the address corresponds to data stored in a cache memory, determines whether the data stored in the cache memory is clean, expands a write cycle if the address corresponds to data stored in the cache memory and the data is clean, writes the write data to the cache memory if the address corresponds to data stored in the cache memory and sets a dirty bit corresponding to the write data if the address corresponds to data stored in the cache memory and the data stored in the cache memory is clean.

One embodiment for implementing the present invention includes an apparatus for writing to a cache memory in a computer system with a processor, where the cache memory includes a tag store and a dirty bit store. The apparatus includes tag compare logic in communication with the tag store. The tag compare logic receives a subset of address bits. The apparatus also includes cache control logic and write cycle expand logic. The cache control logic is in communication with the tag compare logic. The write cycle expand logic is in communication with the tag compare logic and the processor. The write cycle expand logic generates a hold signal during a write access to a location in the cache memory storing clean data associated with the address.

These and other objects and advantages of the invention will appear more clearly from the following description in which the preferred embodiment of the invention has been set forth in conjunction with the drawings.

DETAILED DESCRIPTION

Figure 1:
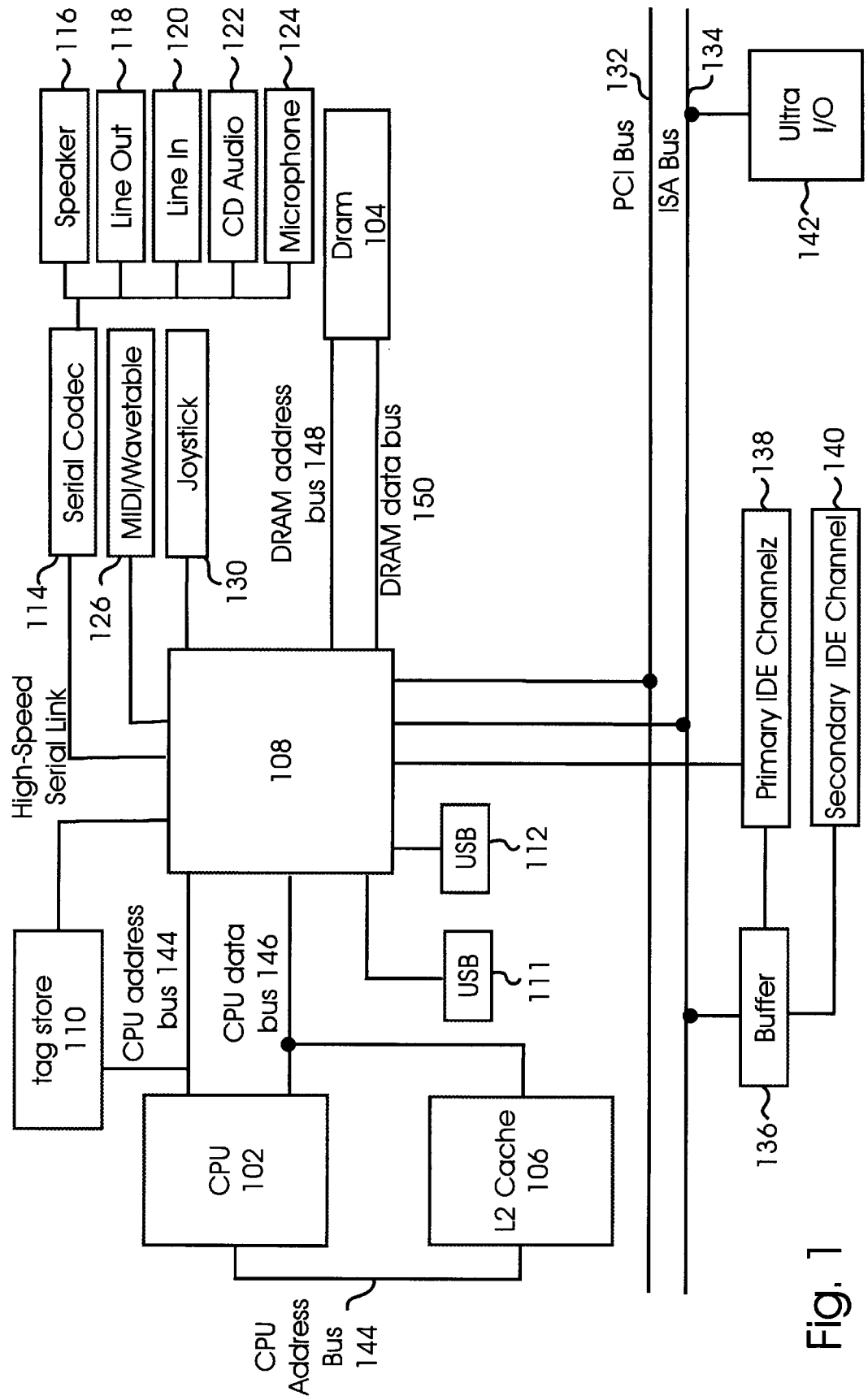
FIG. 1 is a block diagram of a system which utilizes the present invention.

FIG. 1 shows a block diagram of one exemplar computer system which utilizes the present invention. At the heart of the computer system is CPU 102 which can be a Pentium processor, manufactured by Intel Corporation, Santa Clara, Calif. More information about the Pentium processor can be found in various data books from Intel Corporation, including the "Pentium Processor User's Manual, Volume 1, Pentium Processor Data Book," from Intel Corporation, which is incorporated herein by reference. The system shown in FIG. 1 also supports many other processors. CPU 102 includes an internal L1 cache. The L1 cache actually includes two caches: a data cache and a code cache.

System 100 includes DRAM 104 which serves as main memory, an L2 cache 106 and a tag store 110 to be used with L2 cache. System 100 includes support logic 108 which is connected to DRAM 104 via DRAM address bus 148 and DRAM data bus 150. In one embodiment support logic 108 is implemented as a single integrated circuit. CPU address bus 144 is connected from CPU 102 to L2 cache 106, support logic 108 and tag store 110. CPU data bus 146 is connected from CPU 102 to L2 cache 106 and support logic 108. Also connected to support logic 108 are two universal serial bus interfaces 111 and 112.

Support logic 108 is capable of interfacing with audio components. For example, FIG. 1 shows support logic 108 connected to serial codec 114, which can be connected to speaker 116, line out 118, line in 120, CD audio 122 and microphone 124. Support logic 108 is also connected to MIDI/wavetable 126 and joystick 130. Support logic 108 is additionally connected to PCI bus 132, ISA bus 134 and primary IDE channel 138. Buffer 136 is connected between ISA bus 134 and primary IDE channel 138, as well as secondary IDE channel 140. Also connected to ISA bus 134 is Ultra I/O 142, which is an external device responsible for different systems related functions (e.g. parallel port, serial port and real time clock).

Figure 2:
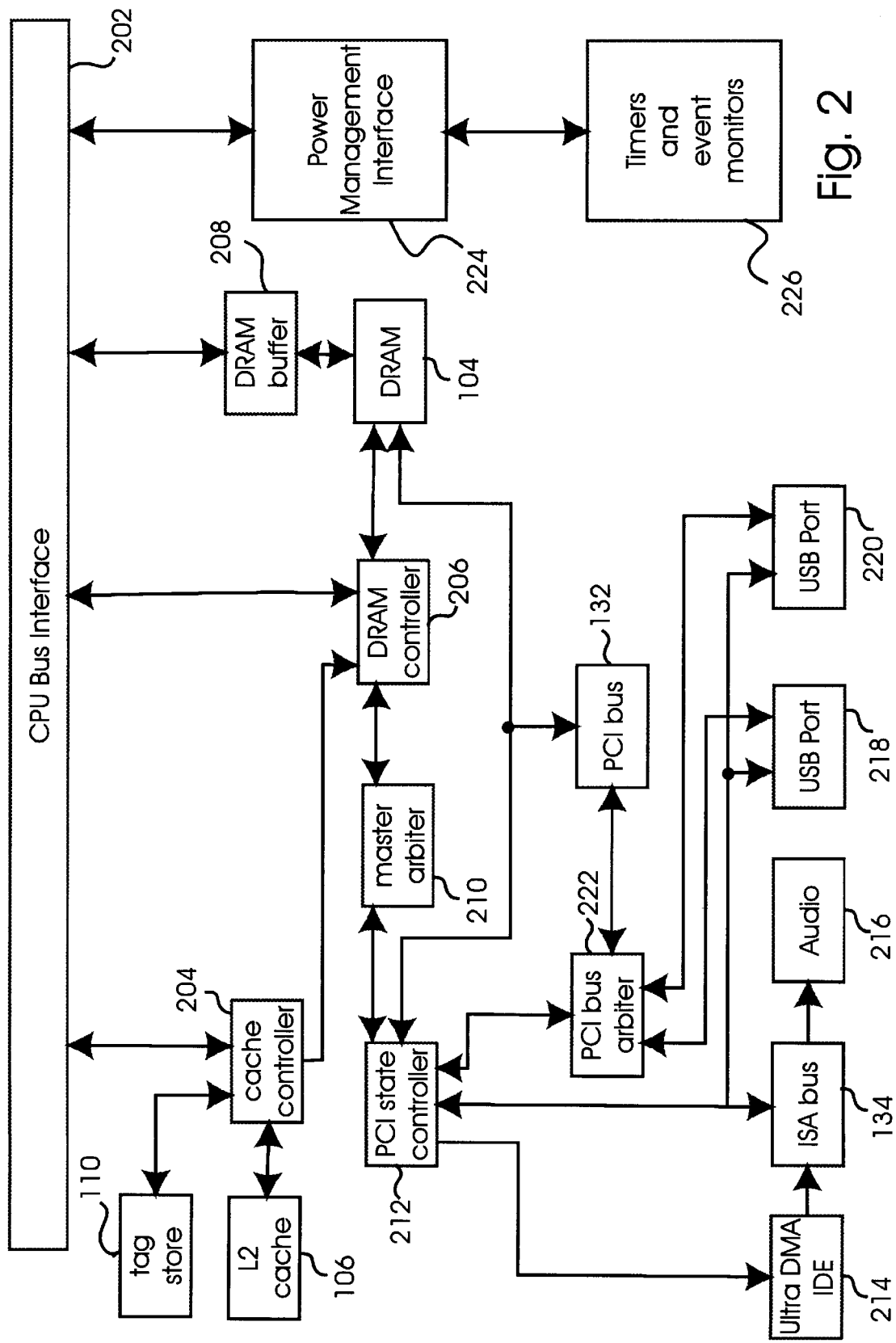
FIG. 2 is a block diagram of the support logic depicted in FIG. 1.

FIG. 2 shows a block diagram of support logic 108. CPU bus interface 202 includes logic for interfacing with CPU 102. Connected to CPU bus interface 202 are cache controller 204, DRAM controller 206, DRAM buffer 208 and power management interface 224. Cache controller 204 is connected to L2 cache 106, tag store 110 and DRAM controller 206. Cache controller 204 includes the logic for controlling L2 cache 106. The signals sent from cache controller 204 to tag store 110 include tag/dirty write enable (TAGWE#) and a bidirectional tag/dirty data bus. The signal TAGWE# serves as both the tag write enable and dirty write enable. Tag store 110 is a 32 K×9 SRAM with 8 bits of the tag/dirty bus being used for a tag and 1 bit being used as a dirty bit. Alternative embodiments can include a 32 K×8 tag store. Cache controller 204 also communicates the tag data to DRAM controller 206. By the term communicates it is meant that a signal (or data) is sent either directly or indirectly from a source to a destination. Thus, DRAM controller 206 is in communication with tag store 110 (e.g. via cache controller 204). Cache controller 204 sends data, write enable and other control signals to L2 cache 106. Among the signals communicated between CPU bus interface 202 and cache controller 204 is the address signal from the processor and a cache hit signal indicating that cache controller 204 has determined that the address received from the CPU has caused a hit in the L2 cache. Cache controller 204 also sends the hit signal and the tag data to DRAM controller 206. CPU bus interface 202 sends the CPU address to DRAM controller 206 for accessing DRAM 104. DRAM controller 206 is connected to DRAM 104. DRAM controller 206 sends the memory address, DRAM write enables, and address strobe signals to DRAM 104.

DRAM buffer 208 is connected between CPU bus interface and DRAM 104. The signals between DRAM buffer 208 and DRAM 104 include memory data in, memory data out, memory parity in and memory parity out. DRAM buffer 208 communicates the data in and data out signal to CPU bus interface 202, which is in communication with CPU data bus 146.

Master arbiter 210 is connected to DRAM controller 206 and PCI state controller 212. PCI state controller 212 is connected to ISA bus 134 and ultra DMA IDE 214, which is a high speed IDE drive that supports the ultra DMA specification. PCI state controller 212 is also connected to PCI bus 132, PCI bus arbiter 222 and DRAM 104. PCI state controller 212 is also connected to USB port 218 and USB port 220. ISA bus 134 is connected to ultra DMA IDE 214 and audio components 216. Support logic 108 also includes timers and event monitors 226 which are connected to power management interface 224. CPU bus interface 202 is connected to power management interface 224.

Cache controller 204, which uses a direct mapped scheme, dramatically boosts the overall performance of the local memory subsystem by caching writes as well as reads. L2 cache 106 can be configured as a single bank of synchronous SRAMs. Cache controller 204 operates in non-pipelined or pipelined mode, with a fixed 32-byte line size in order to simplify the motherboard without increasing costs or degrading system performance. Cache controller 204 includes a tag comparator. Cache controller 204 features a 64 bit wide data bus with 32 byte CPU burst support. The cache hit/miss status is generated by comparing the higher address bits from the memory cycle in progress with the stored tag bits from previous cache entries. When a match is detected and the location is cachable, a cache hit cycle takes place. If the comparator does not detect a match or a noncachable location has accessed, then the current cycle is a cache miss. The dirty bit is a mechanism for monitoring coherency between the cache system and the system memory. Each tagged entry has a corresponding dirty bit to indicate whether the data in the represented cache line has been modified since it was loaded from system memory. This allows support logic 108 to determine whether data in system memory is stale and needs to be updated before a new memory location is allowed to override the currently indexed cache entry.

The choice of which address bits to use for determining the L2 cache hit status will depend on the total L2 cache size. Table 1 shows the address bits from the CPU address (ADDR26–ADDR18) and the tag data bits used by tag comparator 302 (FIG. 3) to determine whether an address causes a hit or a miss in L2 cache 106. The present invention can be used with other cache sizes and other tag data/address bit arrangements.

TABLE 1

| Tag Data | L2 Cache Size | |
| --- | --- | --- |
| | 256 KB | 512 KB |
| TAG0 | ADDR24 | ADDR24 |
| TAG1 | ADDR25 | ADDR25 |
| TAG2 | ADDR18 | ADDR26 |
| TAG3 | ADDR19 | ADDR19 |
| TAG4 | ADDR20 | ADDR20 |
| TAG5 | ADDR21 | ADDR21 |
| TAG6 | ADDR22 | ADDR22 |
| TAG7 | ADDR23 | ADDR23 |
| Dirty Bit | Dirty | Dirty |

Figure 3:
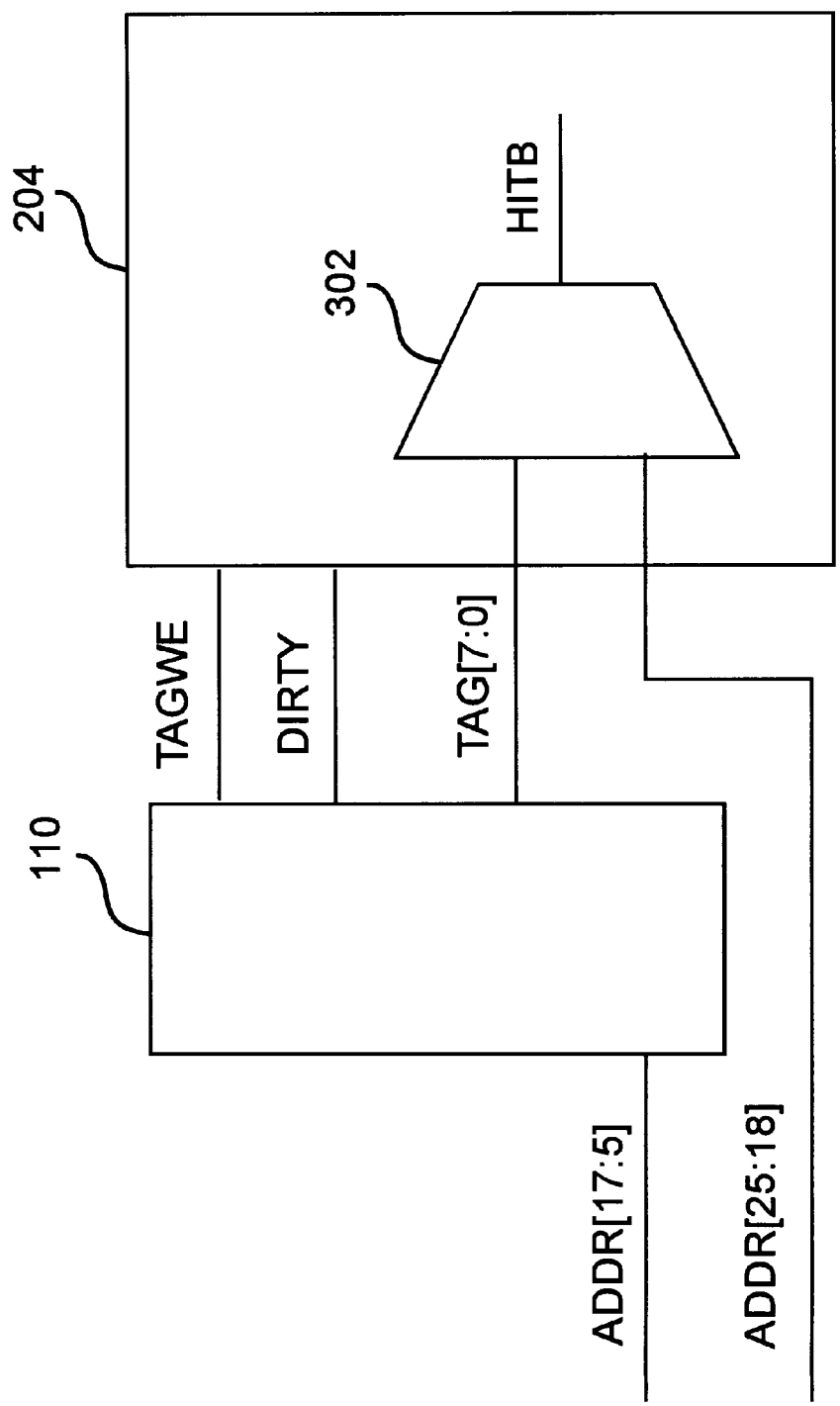
FIG. 3 is a block diagram of the tag store and tag compare logic.

Tag store 110 is implemented, in one embodiment, as a 32 K×9 SRAM. Other tag and dirty store implementations are also suitable for the present invention. FIG. 3 is a block diagram of tag store 110 and tag compare logic. Cache controller 204 includes a tag comparator 302, which compares a tag from tag store 110 to a portion of address from the CPU address bus. As depicted in Table 1, if the system is implementing a 256 KB L2 cache tag, comparator 302 will receive address bits ADDR [25:18]. The address bits ADDR [17:5] are communicated to the address input of tag store 110. Tag store 110 includes 9 bidirectional data pin D [8:0]. The bits D[8:1] are the tag bits (TAG[7:0]) which are communicated to tag comparator 302. The output of tag comparator 302, HITB, is at logic level zero if TAG[7:0] matches ADDR[25:18] (e.g. address corresponds to data in the L2 cache). The bit D[0] is the dirty bit (DIRTY) and is communicated to cache controller 204. Cache controller 204 includes logic for writing a dirty bit or new tag when new data is stored in L2 cache 106. Cache controller 204 also sends a tag write enable (TAGWE#) to the write enable pin of tag store 110. The tag write enable pin serves as both a tag write enable and a dirty bit write enable when a combined SRAM is used for tag and dirty stores.

Figure 4:
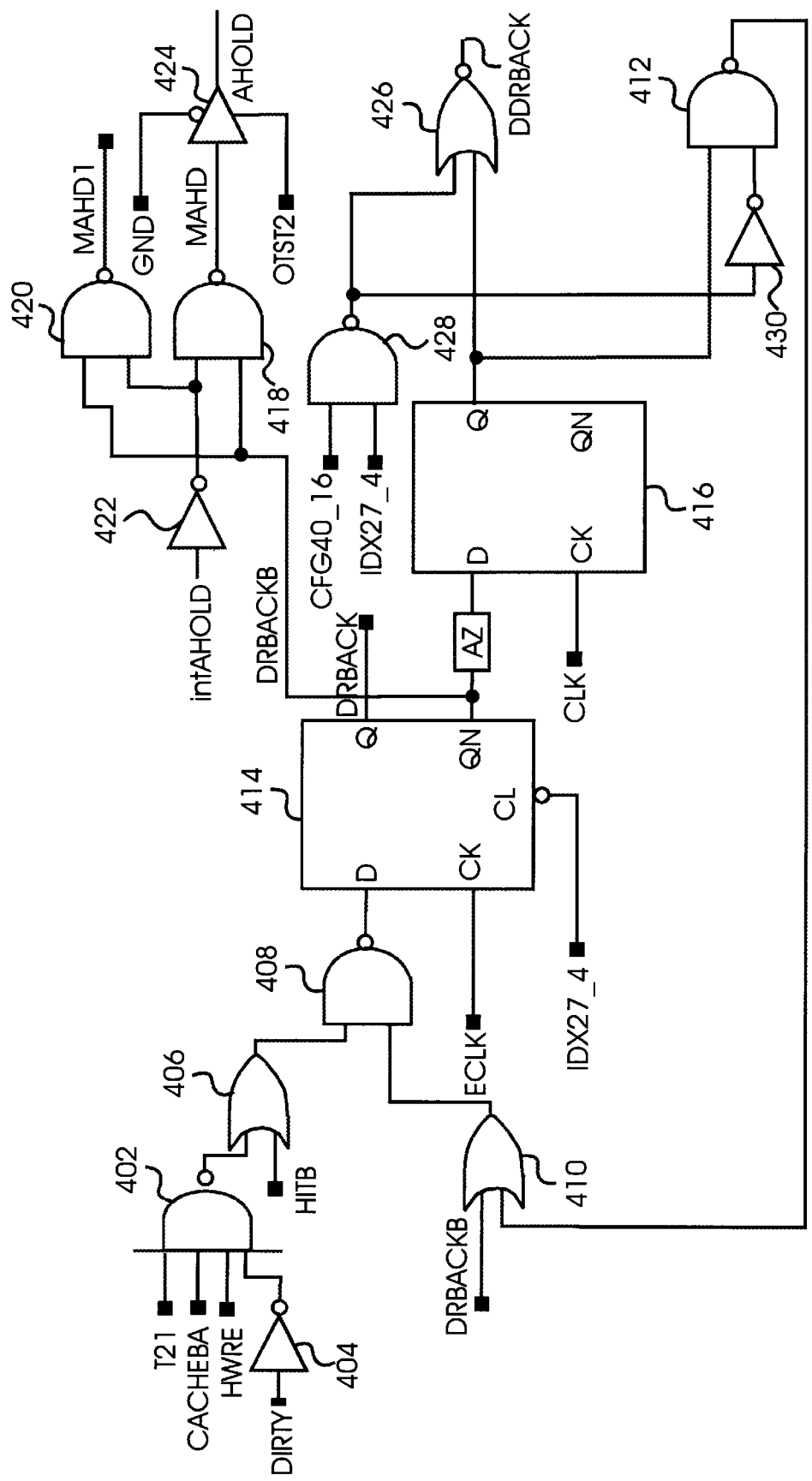
FIG. 4 is a schematic diagram of one embodiment of the write cycle expansion logic.

FIG. 4 is a schematic of the write cycle expansion logic which is part of CPU bus interface 202 FIG. 2). NAND gate 402 includes four inputs T21, CACHBA, HWRE and the output of inverter 404. The signal T21 is communicated from an internal state machine used to interface with the CPU 102 during bus cycles. The signal CACHEBA is an internal version of the signal CACHE# from CPU 102, which indicates cacheability in the L1 cache. If this signal is asserted for a write cycle it indicates a burst write back cycle. The signal HWRE is an internal version of the signal W/R# which is communicated from CPU 102. When the signal W/R# is equal to logic level 1, a bus cycle is a write cycle and if the signal is equal to logic level 0 the bus cycle is a read cycle. The input to inverter 404, DIRTY, is equal to logic level 1 when the current line being accessed in L2 cache 106 is dirty.

The output of NAND gate 402 is one of two inputs to OR gate 406. The other input to OR gate 406 is the signal HITB which is equal to logic level 0 when there is a cache hit. The output of OR gate 406 is one of two inputs to NAND gate 408. The other input to NAND gate 408 is from OR gate 410. The output of NAND gate 408 is connected to the D input of D flip flop 414. The clock input of flip flop 414 is connected to ECLK. Support logic 108 receives a clock signal which is sent to two buffers, with one of the buffers having significantly less loads to drive. The signal coming from the buffer driving less loads is called ECLK and the signal coming from the buffer driving more loads is labeled CLK. The signal CLK is connected to the clock input of D flip flop 416. The Q output of flip flop 414, labeled DRBACK, is used to latch the address from CPU address bus 144. The QN output of flip flop 414 is connected to the D input of D flip flop 416 (over a delay line depicted by a box labeled AZ), an input of NAND gate 418, an input of NAND gate 420 and an input of OR gate 410. The output of inverter 422 is connected as an input to NAND gates 418 and 420. The inputs to inverter 422 is the signal intAHOLD. The signal intAHOLD is used by PCI state controller 212 to request that the CPU not start any new bus cycles so that the CPU's cache can be snooped.

The output of NAND gate 420, MAHD1, is an internal version of the signal AHOLD used by support logic 108. The output of NAND gate 418 is sent to buffer 424. The output of buffer 424 is the signal AHOLD which is communicated to CPU 102. In response to the signal AHOLD being asserted, processor 102 will stop driving the address bus in the next clock. While AHOLD is active, CPU 102 will float (tri-state) the address bus and CPU 102 will not issue a new bus cycle. The Q output of flip flop 416 is connected to NAND gate 412 and NOR gate 426. A second input to NOR gate 426 comes from the output of NAND gate 428. The two inputs to NAND gate 428 are CFG40_16, which is a registered bit that enables address driving, and IDX27_4 which is a registered bit that enables the address expansion logic to perform its function. The circuit of FIG. 4 uses two flip flops in order to keep the signal AHOLD active for two clocks. The output of NAND gate 428 is also connected to the input of inverter 430. The output of inverter 430 is connected as an input to NAND gate 412.

Figure 5:
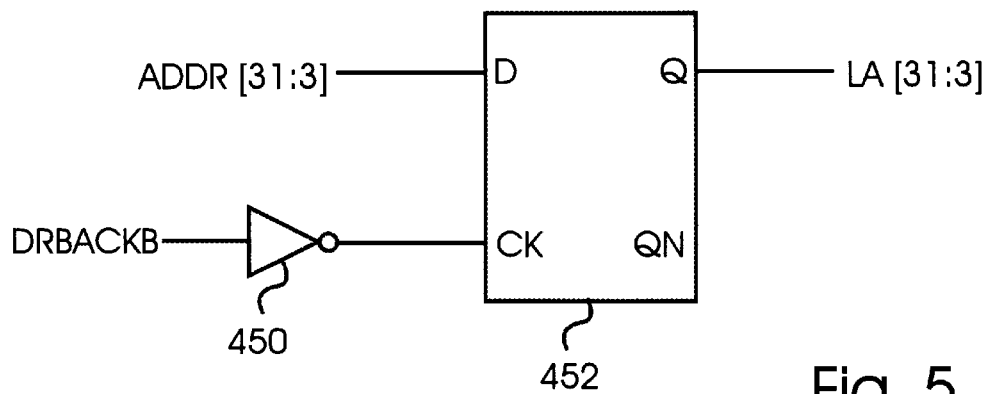
FIG. 5 is a simplified diagram of address driving logic.

In response to AHOLD, CPU 102 will float CPU address bus 144. Because the address may still be needed by the dirty store (and possibly other hardware), support logic 108 drives the address on the bus while the CPU is floating the bus. FIG. 5 depicts the logic used to latch (or hold) an address from CPU address bus 144 and drive that address back on CPU address bus 144 after CPU 102 is no longer driving the address. Inverter 450 receives the signal DRBACKB. The output of inverter 450 is connected to the CK input of D flip flop 452. The D input of flip flop 452 is the address ADDR [31:3] from CPU address bus 144. The Q output of flip flop 452 is LA [31:3] which is the latched address. The latched address LA [31:3] is driven back on to the CPU address bus 144. In some embodiments, LA [31:3] can be sent to a multiplexer with other signals that are to be driven on CPU address bus 144.

Figure 6:
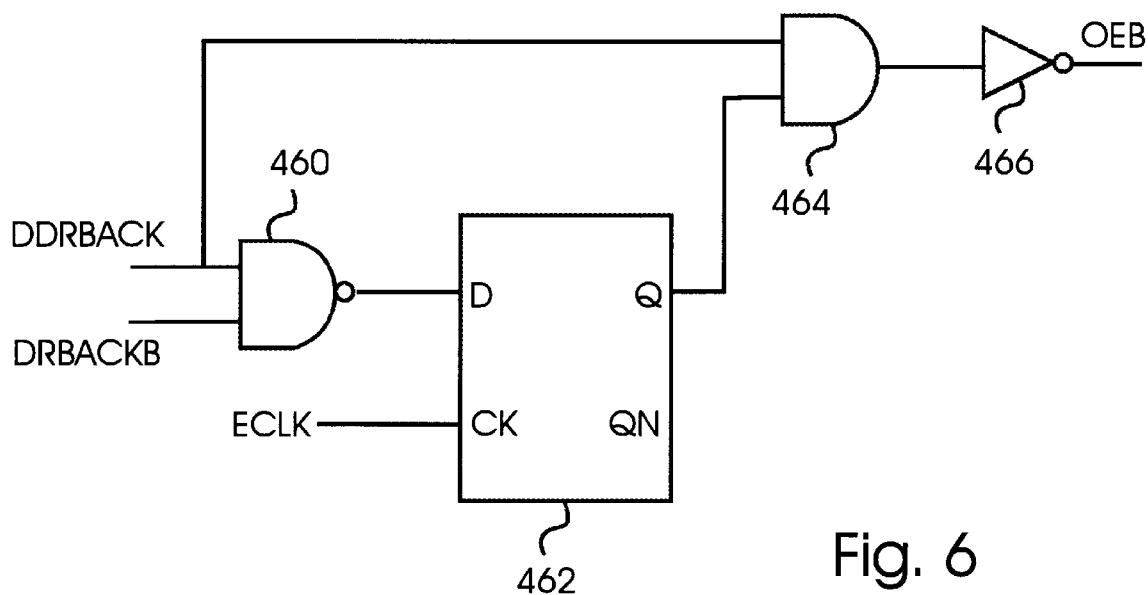
FIG. 6 is a simplified diagram of output enable logic to be used in association with the address driving logic of FIG 5.

FIG. 6 shows the logic used to drive an output enable signal OEB to the bidirectional pins of support logic 108 that are connected to CPU address bus 144. The signal DRBACKB is an input to NAND gate 460. The signal DDRBACKB is an input to NAND gate 460 and AND gate 464. The output of NAND gate 460 is connected to the D input of D flip flop 462. The signal ECLK is connected to the CK input of flip flop 462. The Q output of the flip flop 462 is connected as an input to AND gate 464. The output of AND gate 464 is connected to the input of inverter 466. The output of inverter 466, OEB, is sent to the bidirectional I/O pins of support logic 108 that are connected to CPU address bus 144. The signal DDRBACK is equivalent to the signal DRBACK (FIG. 4) delayed one clock. The hardware depicted in FIGS. 5 and 6 is included within CPU bus interface 202.

Data transfers from CPU 102 to L2 cache 106 or DRAM (s) 104 occur as a result of one or more bus cycles. Logical data operands of byte, word, D word, and quadword may be transferred. Data may be accessed at any byte boundary, but two cycles may be required for misaligned data transfers. Address signals are split into two components. High-order address bits are provided by address lines ADDR [31:3]. Byte enable signals BE7#—BE0# form the low-order address and select the appropriate byte of the 8-byte data bus. Note when accessing L2 cache 106, address bits A [4:3] are not necessary because of the size of the line of data in L2 cache 106.

A bus cycle begins with CPU 102 driving an address and asserting the signal ADS#. The bus cycle ends when the last BRDY# signal is returned. The signal ADS# indicates a new valid bus cycle. ADS# is not driven low and a new bus cycle is not started if the signal AHOLD is asserted. ADS# is driven only in the first clock (or clock period) of the bus cycle and is inactive for subsequent clocks of the cycle. The signal BRDY# is generated by support logic 108 and indicates that valid data has been presented on the data pins of CPU 102 in response to a read request or that support logic 104 has accepted data from CPU 102 in response to a write. When the final BRDY# is returned, the bus cycle is complete. A bus cycle may have one or four data transfers. A burst cycle is a bus cycle with four data transfers.

Figure 7:
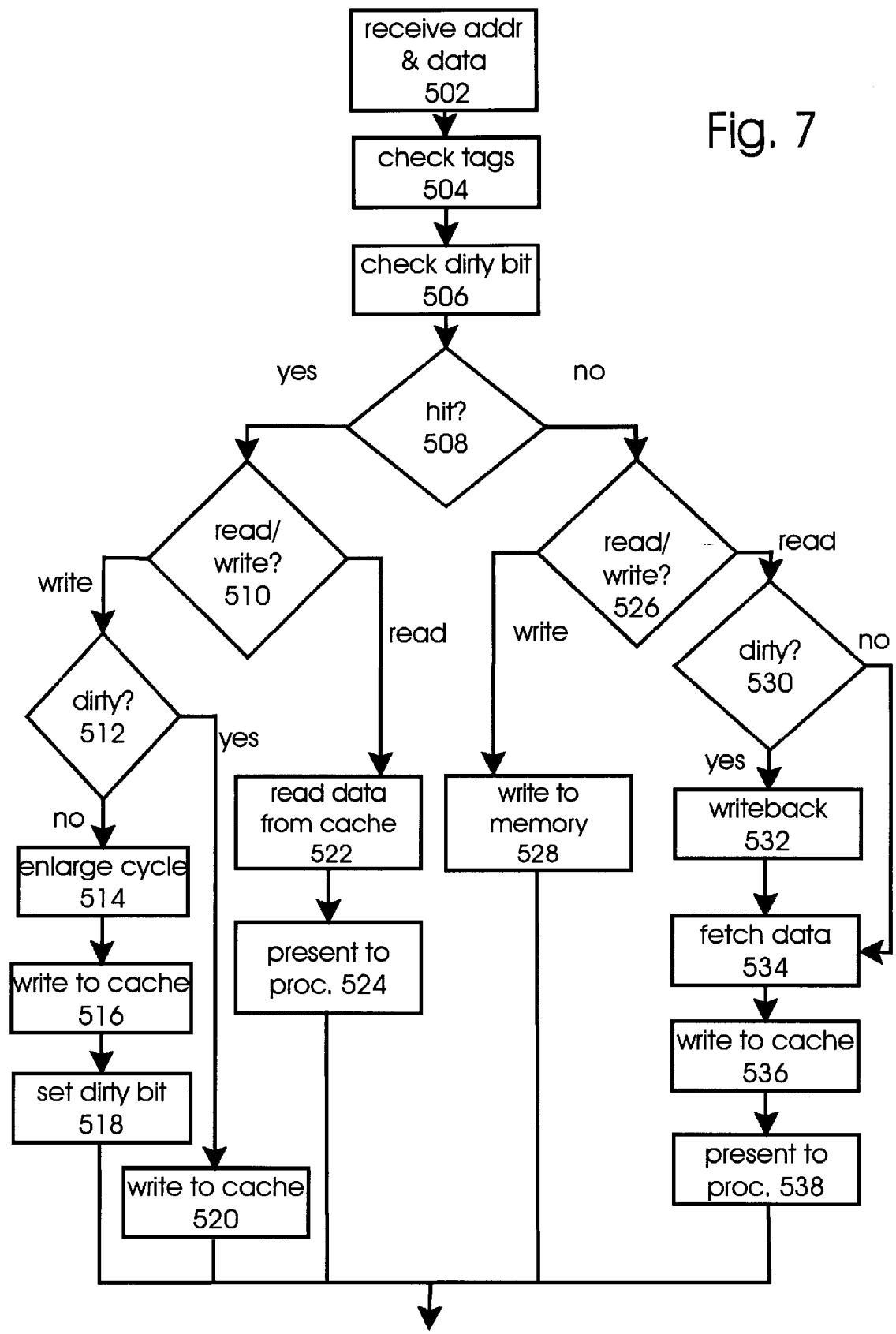
FIG. 7 is a flow chart illustrating the operation of the level two cache of the system depicted in FIG. 1.

FIG. 7 is a flow chart which explains the operation of L2 cache 106 and supporting logic during bus cycles. In step 502, address and data is received over CPU address bus 144 and CPU data bus 146 by CPU interface 202, which transmits the address to cache controller 204. Portions of the CPU address are presented to tag store 110 and L2 cache 106. Data is also presented to L2 cache 106 (during write cycles). In step 504, tag compare 302 compares the tag from tag store 110 to the relevant address bits from CPU address bus 144. In step 506, cache controller 204 checks the dirty bit from tag store 110 to determine whether the data being accessed by the address (e.g. data corresponding to the address) is dirty or clean. If tag compare 302 determines that there is a hit (step 508) and the bus cycle is a read cycle (step 510), then data corresponding to the address on the CPU address bus 144 is read from L2 cache 106 in step 522 and presented to CPU 102 in step 524.

If tag comparator 302 determines that the address caused a hit (step 508) during a write cycle (step 510), then cache controller 204 determines whether the accessed data is dirty or clean (step 512). If the data is dirty, the data is written to L2 cache 106 in step 520, the tags are not updated, the dirty bit is not updated and data is not written to DRAM 104 (main memory). If, in step 512, cache controller 204 determines that the data is clean, then the write cycle expansion logic depicted in FIG. 4 is used to expand the bus cycle in step 514. That is, the signal AHOLD is asserted and communicated to CPU 102. While AHOLD is asserted, CPU will not start a new bus cycle and will stop driving CPU address bus at the next clock. Because support logic 108 still needs the CPU address, CPU bus interface 202 (see FIGS. 5 and 6) will latch the address from CPU address bus 144 and then, subsequently, drive that address back onto CPU address bus 144 so that components receiving the CPU address will still be able to read the address during subsequent clocks. In the implementation shown on FIG. 4, the AHOLD signal will be asserted for two clocks; therefore, the bus cycle will be expanded by two clocks. In other embodiments, the bus cycle can be expanded by more or less than two clocks. In the present embodiment, AHOLD is asserted for two clocks because that is the time interval necessary to set the dirty bit from clean to dirty during a write cycle with a cache hit to clean data. That is, the cycle is expanded to allow for the time necessary to assert the write enable pin for the dirty bit store and to write the new dirty bit. In step 516, the data from the CPU data bus is written to L2 cache 106. Note that only the byte requested is written to the cache, not the entire line. In step 518, the dirty bit is set. Setting the dirty bit includes using half a clock to drive the write enable signal for the RAM and a full clock to write the new dirty bit.

If, in step 508, it is determined that the address caused a miss in the L2 cache and the bus cycle is a write cycle (step 526), then the data on CPU bus 146 is written to DRAM 104. Note that during a write cycle for which there is a cache miss, data is not written to the L2 cache and the tags remain unchanged. If tag comparator 302 determined that there was a miss in step 508 and the bus cycle is a read cycle (step 526), then the system will perform one of two sets of steps depending on whether the data is dirty or clean (step 530). If the data is dirty, the system will write back the data from L2 cache 106 to DRAM 104 in step 532. That is, the system will read the dirty line from the L2 cache and write that data to DRAM 104. In step 534, a new line of data is read from DRAM 104 and written to L2 cache 106 in step 536. In step 538, the requested data is presented to a processor. Note that in the preferred implementation, data is written to the cache in step 536 simultaneously with presenting the data to the CPU in step 538. If, in step 530, it is determined that the data was clean, then the system loops to step 534 and fetches the line of data from main memory, writes the new line of data to L2 cache 106 (step 536) and presents the requested data to CPU 102 in step 538. The inventors note that in most cases the exact order of the steps performed in the flow chart of FIG. 7 can be changed without significantly altering functionality.

Figure 8:
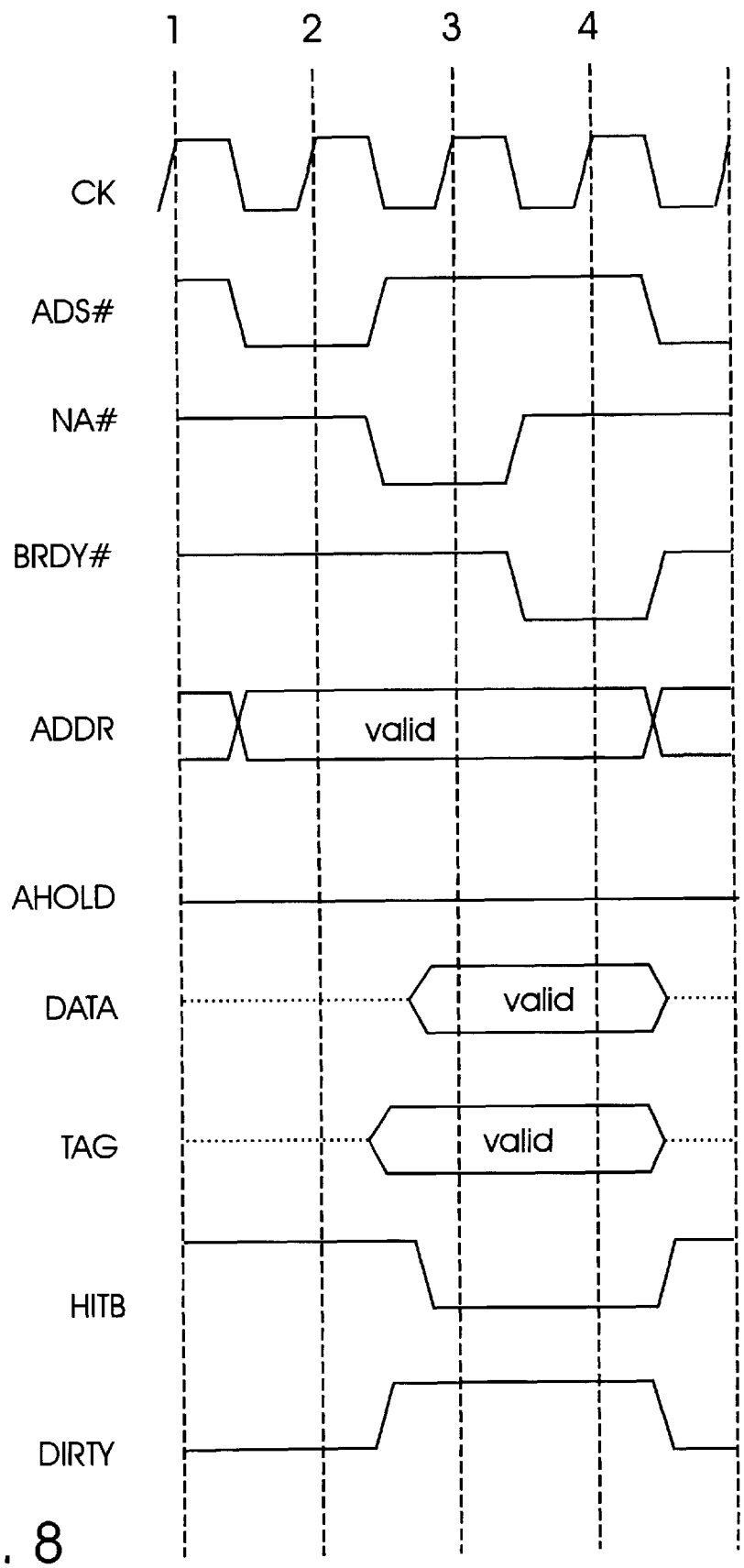
FIG. 8 is a first timing diagram illustrating the behavior of a set of signals during a write to the level two cache depicted in FIG. 1.

FIG. 8 shows a timing diagram which explains the behavior of some of the signals used in the system of FIG. 1. The timing diagram includes 10 signals: CK, ADS#, NA#, BRDY#, ADDR, AHOLD, DATA, TAG, HITB and DIRTY. The signal CK is the clock received by support logic 108, which is buffered and distributed as CLK and ECLK. The signals ADS#, BDRY# and AHOLD have been discussed above. The signal NA# is generated by DRAM controller 206 to indicate that support logic 108 is ready to accept a new address from CPU 102. CPU 102 will drive out a pending bus cycle in response to NA# no sooner than 2 clocks after NA# is asserted. Thus, to reduce the bus cycle and increase performance, the assertion of NA# should not be unnecessarily delayed. The signal ADDR is the contents of the CPU address bus 144. The signal DATA is the contents of CPU data bus 146. The signal TAG corresponds to TAG [7:0] shown in FIG. 3. The signals HITB and DIRTY have been explained above with respect to FIG. 3. Signals with a # are active low.

FIG. 8 shows vertical dashed lines at the beginning of each clock. The vertical lines are numbered corresponding to a particular clock. Thus, FIG. 8 shows four clocks during a single transfer write cycle. During the first clock, ADS# is asserted and the address on CPU address bus 144 becomes valid. Note that FIG. 8 shows a write cycle for a cache hit with dirty data. In the second clock, CPU bus interface 202 asserts NA#, data on CPU data bus 146 becomes valid and the tags (which are asynchronous) become valid. In response to valid tags, tag comparator 302 determines that the address causes a hit and the signal HITB is asserted during the second clock. Additionally, cache controller 204 determines that the DIRTY bit is set; therefore, the data is dirty. Note that the tags become valid and the dirty bit is read at approximately the same time, with the hit determination being made at a small time delay after the tags are valid. During the third clock, the signal NA# is deasserted, BRDY# is asserted, DATA remains valid, TAG remains valid, HITB remains valid and DIRTY remains valid. During the fourth clock, a new bus cycle starts with ADS# being asserted, BRDY# being deasserted and a new address being driven on CPU address bus 144. Additionally, during the fourth clock HITB and DIRTY are no longer valid. Thus, during a write cycle with a cache hit to dirty data, the bus cycle includes three clocks.

Figure 9:
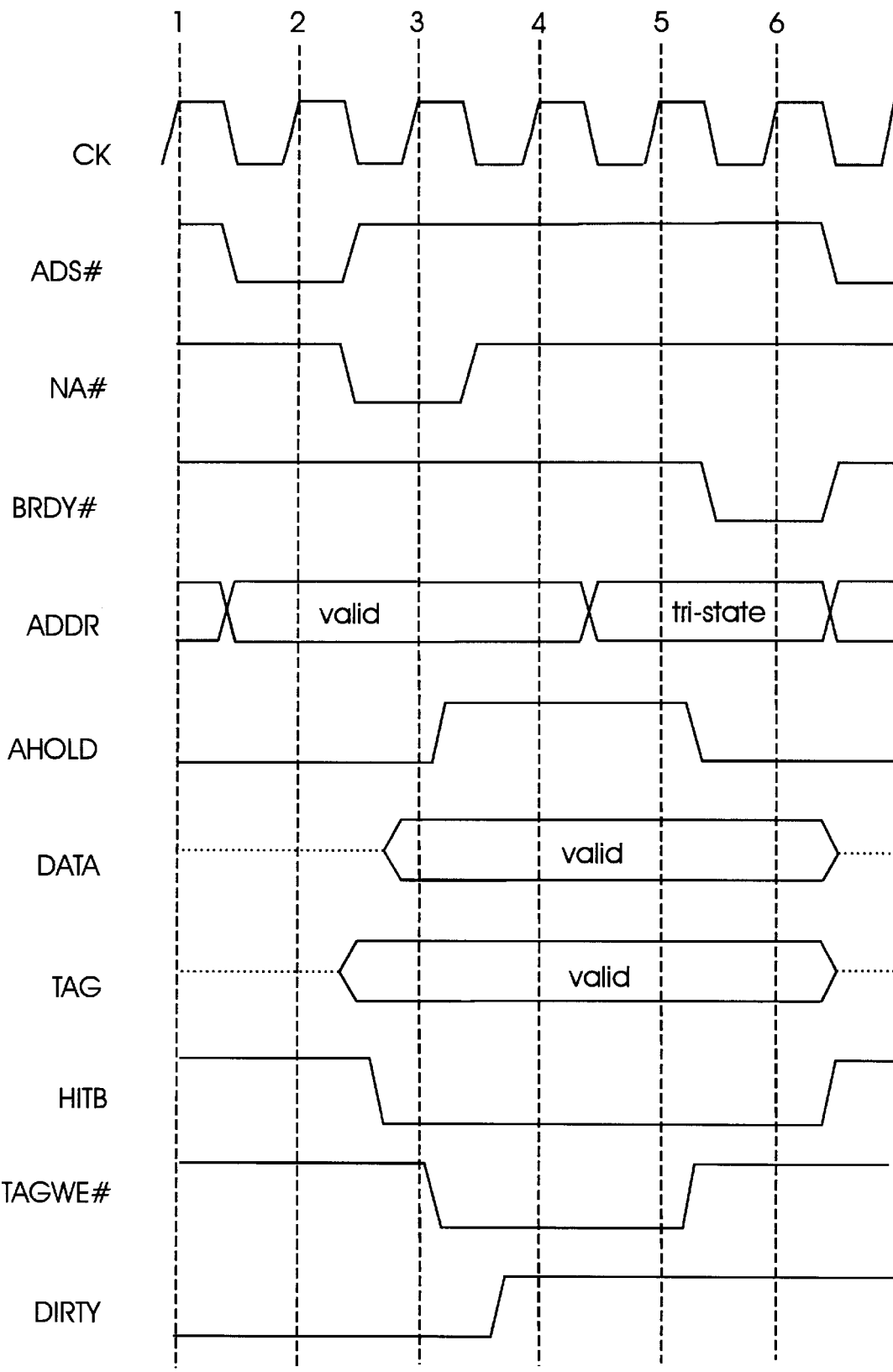
FIG. 9 is a second timing diagram illustrating the behavior of a set of signals during a write to the level two cache depicted in FIG. 1.

FIG. 9 is a timing diagram showing the behavior of certain signals during a single transfer write cycle when there is a cache hit to clean data. FIG. 9 shows six clocks. During the first clock, ADS# is asserted and the address on CPU address bus 144 becomes valid. During the second clock, ADS# is deasserted, DATA on the CPU data bus 146 becomes valid, TAGS become valid, tag comparator 302 determines that there was a hit and the dirty bit is valid. Note that in FIG. 9 the data is clean so the dirty bit is shown as logic level 0. Because the data is clean during a write cycle with a cache hit, the write cycle expansion logic is used to enlarge the cycle (e.g. step 514) by asserting AHOLD during the third clock. AHOLD is communicated at CPU 102 which then tristates CPU address bus 144 during the fourth clock and refrains from commencing an new bus cycle until AHOLD is deasserted. Also during the third clock, NA# is deasserted, DATA on the CPU data bus remains valid, TAG remains valid, HITB remains valid, and the dirty bit write enable signal (TAGWE#) is asserted. In the embodiment shown in FIGS. 1 through 4, the dirty store and tag store are combined. Thus, the signal TAGWE# is used as a dirty bit write enable. A new dirty bit is written during the third clock and fourth clock. During the fifth clock BRDY# is asserted and AHOLD is deasserted, thus, allowing CPU 102 to commence a new bus cycle at the next clock. Also during the fifth clock, data on the CPU data bus remains valid, TAG remains valid, HITB remains valid, and a new dirty bit has been set. During the sixth clock a new bus cycle commences with the assertion of ADS# and a new address being driven on CPU address bus 144. Note that FIGS. 8 and 9 only show one bus cycle. Depending on the type, address and/or data of the next bus cycle, various signals such as DATA, HITB, DIRTY, TAG, etc. may not necessarily go invalid as shown in the last clock of the timing diagrams.

From FIGS. 8 and 9, it can be seen that the bus cycle is expanded from three clocks to five clocks when there is a L2 cache hit during a write cycle to clean data. The extra clocks added to the bus cycle are used to access the tag/dirty store. That is, considering a tag/dirty store implemented with a RAM having a 12 ns access time, the time needed to access a valid tag is approximately 22 ns. This delay includes a delay for transmitting the address from CPU 102 to tag store 110 (approximately 10 ns) and the tag access time (up to approximately 12 ns). Assuming a 15 ns clock period, the tags are valid after the rising edge of clock 2 and before the rising edge of clock 3 (see FIG. 9). After sampling HITB and DIRTY during clock 2, cache controller 204 generates TAGWE# from the rising edge of clock 3. The delay from transmitting TAGWE# from support logic 108 to tag store 110 can be up to about 15 ns. The delay depends on voltage, temperature and process factors.

When TAGWE# is asserted, the outputs of tag store 110 (DIRTY and TAG[7:0]) will tri-state after a maximum of 6 ns. Until the outputs tristate, DIRTY cannot be driven out of cache controller 204 in order to avoid a signal contention (tag store 110 driving 0, cache controller 204 driving 1). Designing a cache controller with a precise 6 ns delay is difficult to achieve. So, to avoid signal contention, cache controller 204 drives DIRTY about half a clock (which is approximately 7.5 ns ±0.75 ns) after driving TAGWE#. The set up time required for tag store 110 is approximately 7 ns. Considering the worst case, the TAGWE# pulse width has to be greater than the time needed to tri-state the outputs and set up the write, which is 8.25 ns ±7 ns for a total of. 15.25 ns. Because the minimum pulse width of TAGWE# is greater than the clock period, TAGWE# is driven for two clocks (shown in FIG. 9 as clock 3 and clock 4). Additionally, the bus cycle needs the fifth clock to account for the 15 ns delay for propagating TAGWE# from cache controller 204 to tag store 110. Thus, a bus cycle during a write to clean data in the L2 cache uses five clocks.

If AHOLD is not asserted and NA# is asserted during clock 2, CPU 102 can generate a new ADS# and a new address after the rising edge of clock 4. Since tag store 110 uses unlatched addresses, during the assertion of TAGWE# it will write data into the wrong address area causing a system failure.

Most systems use synchronous SRAMs as cache RAMs and asynchronous SRAM as tag stores. Generally, writes to a cache implemented with synchronous SRAMs use three clocks and writes to a cache implemented with asynchronous SRAMs use four clocks. Since L2 cache 106 is implemented using synchronous SRAMs, L2 cache 106 can be accessed in three clocks.

Although the disclosed embodiment utilizes a combined tag store and dirty bit store, the present invention can also be used to improve various other cache designs that utilize separate tag and dirty bit stores, as well as designs that implement tag stores or dirty bit stores on the same chip as other supporting logic.

The invention described herein increases performance of a system using a cache. For example, in a typical Pentium based system the performance of the system is very sensitive to single transfer write cycles. If every write cycle uses five clocks, performance would be poor. However, the present invention allows many single transfer write cycles to use only three clocks, thereby, increasing performance. On reason that the present invention can minimize the number of cycles using five clocks is that NA# is asserted in the second clock of a bus cycle, regardless of whether the cycle will be expanded. If the cycle needs to be expanded, the signal AHOLD is asserted.

The foregoing detailed description of the invention has been presented for purposes of illustration and description. It is not intended to be exhaustive or to limit the invention to the precise form disclosed, and obviously many modifications and variations are possible in light of the above teaching. The described embodiment was chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for writing to a cache memory, comprising the steps of:
   receiving write data;
   receiving an address, said write data and said address being associated with a write cycle;
   determining whether said address corresponds to data stored in said cache memory;
   determining whether said data stored in said cache memory is clean if said address corresponds to said data stored in said cache memory;
   indicating to a processor a readiness to accept a new address from said processor regardless of whether said data stored in said cache memory is clean if said address corresponds to said data stored in said cache memory;
   expanding said write cycle if said address corresponds to said data stored in said cache memory and said data stored in said cache memory is clean, said step of expanding is commenced after said step of indicating is commenced;
   writing said write data to said cache memory if said address corresponds to said data stored in said cache memory; and
   setting a dirty bit corresponding to said write data if said address corresponds to said data stored in said cache memory and said data stored in said cache memory is clean.

2. A method according to claim 1, wherein:
   said address includes a plurality of bits;
   said step of determining whether said address corresponds to data stored in said cache memory includes the steps of:
   using a first subset of said plurality of bits to select a tag;
   comparing a second subset of said plurality of bits to said selected tag; and
   signaling a hit if said second subset of bits matches said tag.

3. A method according to claim 2, wherein:
   said dirty bit and said tag are stored in a single device.

4. A method according to claim 1, wherein:
   said step of setting said dirty bit includes asserting a dirty bit write enable and driving dirty bit data.

5. A method according to claim 1, wherein:
   said write cycle is not expanded if said data stored in said cache memory is dirty.

6. A method according to claim 1, wherein:
   said write cycle is not expanded if said address does not corresponds to data stored in said cache memory.

7. A method according to claim 1, wherein:
   said step of expanding includes driving said address on an address bus, said step of driving being performed by logic other than said processor.

8. A method according to claim 1, further including the steps of:
   writing data to system memory if said address does not correspond to data stored in said cache memory.

9. A method according to claim 1, wherein:
   said step of expanding adds two clock periods to said write cycle.

10. A method according to claim 1, wherein:
    said step of expanding includes preventing a new write or read cycle from commencing.

11. A method according to claim 10, wherein:
    said step of expanding further includes causing an address bus to float.

12. A method according to claim 1, wherein:
    said step of expanding includes signaling a processor to refrain from driving a new address.

13. A method according to claim 1, wherein:
    said step of expanding includes signaling said processor to refrain from starting a new bus cycle;
    said step of determining whether said data stored in said cache memory is clean is performed during a second clock period of a current bus cycle;
    said step of indicating is performed during said second clock period of said current bus cycle; and
    said signaling said processor to refrain from starting a new bus cycle commences during a third clock period of said current bus cycle.

14. A method according to claim 13, wherein:
    said signaling said processor to refrain from starting a new bus cycle causes said current bus cycle to be expanded from three clock periods to five clock periods.

15. A method according to claim 1, wherein:
    said step of expanding includes signaling said processor for two clock periods to refrain from driving a new address.

16. A method according to claim 1, wherein:
    said step of setting a dirty bit is performed after said step of expanding is commenced.

17. A method for using a cache memory, said cache memory being separate from a processor, comprising the steps of:

receiving first data and a first address, said first address being sent from said processor;

determining whether said first address corresponds to clean data in said cache memory;

indicating to said processor a readiness to accept a new address from said processor if said first address corresponds to data in said cache memory, regardless of whether said data is clean data;

requesting said processor to refrain from sending a new address if said first address corresponds to clean data in said cache memory during a write cycle, said step of indicating is commenced prior to commencing said step of requesting;

writing said data to said cache memory if said first address corresponds to data in said cache memory; and setting a dirty bit corresponding to said first data if said step of determining determined that said first address corresponded to clean data in said cache.

18. A method for using a cache memory, said cache memory being separate from a processor, comprising the steps of:

receiving first data and a first address, said first address being sent from said processor;

determining whether said first address corresponds to clean data in said cache memory;

requesting said processor to refrain from sending a new address if said first address corresponds to clean data in said cache memory during a write cycle;

writing said data to said cache memory if said first address corresponds to data in said cache memory; and setting a dirty bit corresponding to said first data if said step of determining determined that said first address corresponded to clean data in said cache; and receiving second data and a second address;

determining that second address does not correspond to data in said cache memory; and writing said data to main memory without requesting said processor to refrain from sending addresses.

19. A method according to claim 17, further including the step of:

driving said first address on an address bus after said step of requesting.

20. An apparatus for writing to a cache memory, comprising:

means, in response to an address, for determining whether said address causes a hit for clean data in said cache memory;

means, in response to said address, for writing to said cache memory at a location in said cache memory corresponding to said address if said address causes a hit;

means for indicating to a processor a readiness to accept a new address from said processor, and means for expanding a write cycle if said address causes a hit for clean data in said cache memory during said write cycle without expanding said write cycle if said address causes a hit for dirty data in said cache memory during said write cycle said means for expanding a write cycle is able to expand said write cycle if said means for indicating to said processor indicates said readiness to accept said new address from said processor.

21. An apparatus according to claim 20, including:

a storage device in communication with said means for writing.

22. An apparatus according to claim 20, wherein:

said means for expanding asserts a hold signal if said address causes a hit for clean data in said cache memory during said write cycle and does not assert said hold signal if said address causes a cache miss during said write cycle, said hold signal being communicated to said processor.

23. An apparatus according to claim 22, wherein:

said means for expanding asserts said hold signal for two clock periods.

24. An apparatus according to claim 22, wherein:

said means for expanding asserts said hold signal for a period of time sufficient to allow a dirty bit to be set.

25. An apparatus according to claim 22, wherein:

said means for expanding includes address logic for driving said address on an address bus after said hold signal is asserted.

26. An apparatus according to claim 20, further including:

a single memory device for storing tags and dirty bits.

27. An apparatus for writing to a cache memory in a computer system with a processor, said cache memory including a tag store and a dirty bit store, said system receiving an address, said address including a plurality of address bits, the apparatus comprising:

tag compare logic in communication with said tag store, said tag compare logic receives a subset of said address bits from said processor;

cache control logic in communication with said tag compare logic;

memory control logic in communication with said processor, said memory control logic generates a first signal indicating to said processor a readiness to accept a new address from said processor; and write cycle expand logic in communication with said tag compare logic and said processor, said write cycle expand logic generating a hold signal during a write access to a location in said cache memory storing clean data associated with said address, said hold signal is communicated to said processor subsequent to said first signal.

28. An apparatus according to claim 27, wherein:

said write cycle expand logic includes combinational logic for determining if a hit has been detected for clean data during a write cycle and means for maintaining said hold signal.

29. An apparatus according to claim 27, wherein:

said write cycle expand logic includes:

means for determining if a bus cycle is a write cycle resulting in a hit to said cache memory and accessing clean data; and means for generating said hold signal based on said means for determining.

30. An apparatus according to claim 27, wherein:

said hold signal is asserted for two clock periods.

31. An apparatus according to claim 27, wherein:

said hold signal is adapted to be communicated to an address hold input of said processor.

32. An apparatus according to claim 27, wherein:

said write cycle expand logic includes a bus driver circuit adapted to drive said address on a bus.

33. An apparatus according to claim 26, wherein:

said write cycle expand logic includes a bus driver circuit adapted to drive said address on a bus after said write cycle expand logic generates said hold signal and before said processor drives a new address.

34. An apparatus for using a cache, comprising:

main memory;

cache memory;

a processor in communication with said cache memory and said main memory, said processor providing an address, said address including a plurality of address bits;

a tag store receiving a first subset of said address bits;

a dirty bit store;

tag compare logic in communication with said tag store, said tag compare logic receives a second subset of said address bits and compares said second subset of address bits to a set of bits received from said tag store;

cache control logic in communication with said tag compare logic, said tag store, said dirty bit store and said processor;

a memory controller in communication with said processor, said memory controller generates a first signal indicating to said processor a readiness to accept a new address from said processor; and write cycle expand logic in communication with said tag compare logic and said processor, said write cycle expand logic generating and communicating to said processor a hold signal during a write access to a location in said cache memory corresponding to said addresses and storing clean data, said processor refraining from providing a new address while said hold signal is being received by said processor, said hold signal being generated and communicated subsequent to said first signal being generated.

35. An apparatus according to claim 34, wherein:

said processor having an address hold input; and said hold signal is communicated to said address hold input of said processor.

36. An apparatus according to claim 34, wherein:

said cache memory being external to said processor.

37. An apparatus according to claim 34, wherein:

said cache memory being a level two cache external to said processor.

38. An apparatus according to claim 34, wherein:

said write cycle expand logic includes a bus driver circuit adapted to drive said address on a bus after said write cycle expand logic generates said hold signal and before said processor drives a new address.

39. A method for writing to a cache memory, comprising the steps of:

receiving an address from a processor during a first clock;

receiving write data during a second clock, said write data and said address being associated with a write cycle;

asserting a first signal to said processor during said second clock indicating readiness to accept a new address;

determining whether said address corresponds to data stored in said cache memory during said second clock;

determining whether said data stored in said cache is clean if said address corresponds to said data stored in said cache memory during said second clock;

expanding said write cycle if said address corresponds to said data stored in said cache memory and said data stored in said cache memory is clean, said step of expanding includes asserting a hold signal to said processor during a third clock;

writing said write data to said cache memory if said address corresponds to data stored in said cache memory; and setting a dirty bit corresponding to said write data if said address corresponds to data stored in said cache memory and said data stored in said cache memory is clean.

40. A method according to claim 39, wherein:

said step of expanding said write cycle adds two clock periods to said write cycle.

\* \* \* \* \*